(12) United States Patent
Becoulet et al.

(10) Patent No.: US 10,001,027 B2
(45) Date of Patent: Jun. 19, 2018

(54) TURBINE ENGINE COMPRISING A DEVICE FOR BRAKING THE FAN ROTOR

(71) Applicant: SNECMA, Paris (FR)

(72) Inventors: Julien Fabien Patrick Becoulet, Moissy-Cramayel (FR); Alexandre Jean-Marie Tan-Kim, Savigny le Temple (FR)

(73) Assignee: SNECMA, Paris (FR)

( * ) Notice: Subject to any disclaimer, the term of this patent is extended or adjusted under 35 U.S.C. 154(b) by 235 days.

(21) Appl. No.: 14/876,585

(22) Filed: Oct. 6, 2015

(65) Prior Publication Data
US 2016/0097298 A1 Apr. 7, 2016

(30) Foreign Application Priority Data
Oct. 7, 2014 (FR) .................................... 14 59595

(51) Int. Cl.
*F01D 21/00* (2006.01)
*F01D 21/04* (2006.01)
(Continued)

(52) U.S. Cl.
CPC .............. *F01D 21/04* (2013.01); *F01D 5/02* (2013.01); *F01D 5/12* (2013.01); *F01D 5/30* (2013.01);
(Continued)

(58) Field of Classification Search
CPC ... F01D 21/04; F01D 5/02; F01D 5/12; F01D 5/30; F01D 9/02; F01D 21/006;
(Continued)

(56) References Cited

U.S. PATENT DOCUMENTS 3,495,919 A * 2/1970 McLimore ............ F01D 21/006
188/185
4,799,354 A * 1/1989 Midgley ................... F02C 7/26
416/32
(Continued)

FOREIGN PATENT DOCUMENTS

EP 1 564 352 A2 8/2005
WO WO 2006/021078 A1 3/2006

OTHER PUBLICATIONS

French Search Report dated May 29, 2015, 8 pgs.

*Primary Examiner* — Kenneth Bomberg
*Assistant Examiner* — Brian Delrue
(74) *Attorney, Agent, or Firm* — Womble Bond Dickinson (US) LLP

(57) ABSTRACT

The invention relates to a turbine engine comprising a fixed structure (7), a fan (1) rotor (3), having an axis (XX) of rotation, and emergency braking means (12, 13) of the rotor (3), in particular in the event of the loss of a blade of the fan (1), characterized in that said emergency braking means (12, 13) comprise a first (18) and a second (22) member supported by the fixed structure (7), said members (18, 22) respectively being configured so as to interact frictionally with a first (20) element which is complementary to the rotor (3), by forming a stop of the rotor (3) towards the rear along the axis (XX), and a second (24) element which is complementary to the rotor (3), by forming a stop of the rotor (3) towards the front along the axis (XX), when the emergency braking means (12, 13) are active.

12 Claims, 3 Drawing Sheets

(51) Int. Cl.
*F01D 5/12* (2006.01)
*F01D 5/30* (2006.01)
*F01D 9/02* (2006.01)
*F01D 5/02* (2006.01)
*F02K 3/06* (2006.01)

(52) U.S. Cl.
CPC ............. *F01D 9/02* (2013.01); *F01D 21/006* (2013.01); *F01D 21/045* (2013.01); F01D 5/025 (2013.01); F02K 3/06 (2013.01); F05D 2220/30 (2013.01); F05D 2220/36 (2013.01); F05D 2240/24 (2013.01); F05D 2260/902 (2013.01); F05D 2260/941 (2013.01); Y02T 50/671 (2013.01)

(58) Field of Classification Search
CPC .......... F01D 21/045; F01D 5/025; F02K 3/06; F05D 2220/30; F05D 2220/36; F05D 2240/24; F05D 2260/902; F05D 2260/941
USPC ......................................................... 415/123
See application file for complete search history.

(56) References Cited

U.S. PATENT DOCUMENTS

| | | | | |
|---|---|---|---|---|
| 5,797,544 A * | 8/1998 | Ward | ............. | F02K 1/004 239/265.37 |
| 5,813,611 A * | 9/1998 | Cires | ............. | F02K 1/004 239/265.37 |
| 6,312,215 B1 * | 11/2001 | Walker | ............. | F01D 21/006 188/74 |
| 6,672,049 B2 * | 1/2004 | Franchet | ............. | F02C 3/113 60/226.1 |
| 7,448,198 B2 * | 11/2008 | Trumper | ............. | F01D 21/006 60/204 |
| 7,849,668 B2 * | 12/2010 | Sheridan | ............. | F01D 15/10 184/6.11 |
| 8,127,525 B2 * | 3/2012 | Bart | ............. | F01D 21/006 415/9 |
| 8,161,727 B2 * | 4/2012 | Bart | ............. | F01D 21/006 415/123 |
| 8,684,299 B2 * | 4/2014 | Bulin | ............. | B64C 25/405 244/100 R |
| 2005/0172608 A1 * | 8/2005 | Lapergue | ............. | F01D 21/045 60/226.1 |

* cited by examiner

TURBINE ENGINE COMPRISING A DEVICE FOR BRAKING THE FAN ROTOR

FIELD OF THE INVENTION

The present invention relates to a turbine engine comprising a fan having a device which is intended to reduce the dynamic loads in the event of an accident on the fan, leading to the loss of a blade.

PRIOR ART

A turbine engine mounted on an aircraft comprises, from front to rear, or from upstream to downstream, in the direction of the flow of the gases, a fan, one or more compressor stages, a combustion chamber, one or more turbine stages, and a gas exhaust pipe. The fan comprises a rotor fitted with blades on the periphery thereof, which, when said blades are set into rotation, feed the air into the turbine engine. The fan rotor is connected to a drive shaft, which is centred on the axis of the turbine engine by a series of bearings, which are supported by support parts which are connected to a fixed structure of the stator of the turbine engine.

By accident, and fortunately infrequently, a fan blade might break during a flight. In this case, the engine is stopped, but the rotor of the low-pressure portion enters automatic rotation, primarily because of the aerodynamic forces on the fan, which are linked to the speed of the aircraft. This phenomenon is commonly referred to as windmilling. A significant imbalance thus occurs on the drive shaft of the fan, which leads to dynamic loads and vibrations on the bearings, which are transmitted to the fixed structure of the turbine engine.

It is particularly important to make it possible for the overall structure of the turbine engine and of the aeroplane to withstand, without additional damage, these forces for a significant duration, of approximately a few hours, so as to allow the aeroplane to return to land after such an incident.

In order to be able to size the structure of the turbine engine so as to be less heavy and less costly, the prior art discloses, such as in FR-A1-2,752,024 and FR-A1-2,877,046, providing a system for decoupling one or more bearings in the event of the loss of a blade. This changes the flexibility of the arrangement of the fan rotor and makes it possible to adapt the resonance modes thereof so as to reduce the forces produced by the imbalance.

The structure of the turbine engine and the aircraft is sized so as to tolerate the imbalance created by the fan rotor after the loss of a blade and the decoupling. In particular, certain supports have thicknesses or manufacturing specifications, in terms of material or structure, which are oversized in relation to the normal operating constraints.

The aim of known solutions for reducing the load and the vibrations during this autorotation is to shift the frequency response of the structure, when the rotor is in the decoupled mode, out of the frequency range of the stresses, for example by changing the flexibility of the upstream structure holding the rotor or the position of a bearing of the shaft of the fan. However, this shifting of the response of the structure in the decoupled mode can pose problems, in particular can increase the loads at the start of the accident, during the loss of the blade, before the rotational speed of the fan decreases. It can therefore be difficult to find a good compromise between the maximum loads appearing during the loss of the blade and those which have to be tolerated during the flight phase in autorotation.

The aim of the present invention is therefore that of providing a means for reducing the weight of the elements of the turbine engine and aeroplane which are sized so as to tolerate the imbalances in the event of the loss of a blade, by reducing the loads and the vibrations to which the structure of said turbine engine will be subjected during the flight phase in autorotation, thereby also making it possible to reduce the stresses that the turbine engine transmits to the structure of the aeroplane during this flight phase.

SUMMARY OF THE INVENTION

For this purpose, the invention relates to a turbine engine comprising a fixed structure, a fan rotor, having an axis of rotation, and emergency braking means of the rotor, said emergency braking means comprising a first and a second member supported by the fixed structure, said members respectively being configured so as to interact frictionally with a first element which is complementary to the rotor, by forming a stop of the rotor towards the rear along the axis, and a second element which is complementary to the rotor, by forming a stop of the rotor towards the front along the axis, when the emergency braking means are active, characterised in that it further comprises means which are arranged so as to release at least one of said members in translation relative to the fixed structure along the axis of rotation, in the direction opposite to that for which it forms a stop, when the emergency braking means are activated.

The term fan rotor refers here to all of the parts at the front of the turbine engine rotating at the same time as the blades of the fan, including the drive shaft to which it is fixed and which passes into the bearing(s) guiding the rotation of the fan. The braking of the rotor acts in at least two ways to reduce the loads and vibrations which are induced, in particular in the event of the loss of a blade of the fan. Firstly, it reduces the value to which the rotational speed of the fan rotor is set in autorotation, for a given speed of the aeroplane. This reduces the intensity of the vibrations, which decrease with the rotational speed of the fan during the stabilised flight phase after the accident. Secondly, the braking reduces the maximum load level by slowing down the rotor to a greater extent and limiting the time for transitioning to the vicinity of the resonance mode before the speed stabilises.

The first member and complementary element, firstly, and the second member and complementary element, secondly, form two braking devices acting in two opposite directions along the axis of rotation. The axial movement of the fan rotor is thus used, which has a tendency, in a first period after the accident, to move towards the rear, then in a second period to move back towards the front. After the accident, there will therefore still be at least one active braking device and, for the duration, during a flight phase for returning to an airport, the two intervene.

Since one of said members is released in translation in the opposite direction to that for which it forms a stop, when the decoupling device is broken, this allows it to follow the movement of the rotor in the opposite direction to the stop direction thereof, thus to continue to ensure friction in this case.

Preferably, the first member is arranged in front of the second member along the axis. Another advantage of the invention is that of holding the rotor axially around an average position, thus preventing said rotor from damaging other parts of the turbine engine by excessive movement towards the rear, or preventing it from escaping towards the front. Moreover, the friction between a member and the complementary element thereof is a simple means for obtaining significant braking. Considering the fact that this system only has to activate in the event of an accident and operate for a limited number of hours, the size of the members and elements ensuring the friction can be limited in weight.

Advantageously, the extension of the contact surfaces between the members and the complementary elements is primarily radial. Firstly, this makes it possible to optimise the extent of the friction surface in the environment of the rotor of the fan. Secondly, since the intensity of the friction depends, inter alia, on the pressure exerted on the contacts, it is easier to ensure axial support between a part which is connected to the rotor and a part which is connected to the stator, than radial clamping of an element of the rotor by a member which is connected to the structure.

Moreover, the contact surfaces between the members and the complementary elements thereof may also have an axial extension portion. This makes it possible to increase the contact surfaces between the members and the complementary elements thereof without having too great an impact on the bulk of the system.

Advantageously, the turbine engine comprises at least a first bearing, which is mounted between the fan rotor and a support part, said means which are arranged to release at least one of said members comprising means for fixing said support part being connected to the fixed structure by said fixing means which are arranged so as to break in the event of the loss of a blade of the fan, so as to form a device for decoupling the rotor. The decoupling process itself releases the movements of the fan rotor along the axis of rotation and thus enhances the possibilities of friction of a member against the complementary element.

The mechanical coupling of the braking member to the structure having fixing means which are arranged so as to break during the decoupling of the fan rotor allows the device to be set up automatically at the moment of the accident.

The triggering of the decoupling device is a good marker for activating the braking means, since this decoupling takes place at the very start of the incident, before the constraints reach a maximum after the loss of the blade. The decoupling process itself releases the movements of the fan rotor along the axis of rotation and thus enhances the possibilities of friction of a member against the complementary element.

Advantageously, said means which are arranged to release at least one of said members comprise a part which is rigidly connected to said member and is connected to the fixed structure by the fixing means, and the turbine engine comprises means limiting the axial movement of said part when said fixing means are broken.

Advantageously, also, the turbine engine is arranged in such a way that said fixing means block said part in rotation about the axis when said fixing means are broken.

Preferably, the turbine engine further comprises a means which is configured to bias at least one of said members against the corresponding complementary element when said decoupling device is broken. A biasing means of this type makes it possible, in particular, to hold the member released in translation such that it is pressed against the corresponding element on the rotor when the rotor moves in the opposite direction to the stop formed by said member.

In addition, the biasing means may comprise a spring means between said part and the fixed structure.

Advantageously, only the first member is biased by a biasing means, the second member being mounted so as to be rigidly connected to the fixed structure.

The rotor has a tendency to move back towards the front during a significant flight phase after the first sequences of the accident. It is therefore advisable for the first member to follow this movement, however, a fixed device for the second member has a simpler design and can of course be biased during these flight phases.

Advantageously, in this case, the turbine engine has a normal operating configuration, in particular before the loss of a fan blade, wherein the emergency braking means are inactive and are configured in such a way that the gap along the axis between the first member and element is larger than the gap between the second member and element.

Thus, pressing the first member, which drives the complementary element on the rotor, towards the front means that the second member and the complementary element on the rotor, which form a stop towards the front of the fan rotor, are also in contact. The two braking devices are therefore active together during the flight phases after the accident due to the thrust means of the first device.

Preferably also, the fan rotor is centred and guided by at least a second bearing which is mounted between the fixed structure and the rotor, said second bearing being located between said members.

The first bearing having been decoupled, this second bearing represents a fixed point for the movements due to imbalance of the fan rotor. It is therefore easier to design braking devices for the surfaces of the members which are connected to the fixed structure and the elements which are connected to the rotor rub substantially in a rotational movement.

Advantageously, the thrust means towards the front of said first member rests between the support part of said member and a support part of the second bearing.

Advantageously, the fan rotor comprises a drive shaft, which can support at least one of said elements.

BRIEF DESCRIPTION OF THE DRAWINGS

The present invention will be better understood, and other details, features and advantages of the invention will become clearer upon reading the following description of a non-limiting example with reference to the accompanying drawings, in which.

DESCRIPTION OF AN EMBODIMENT

Figure 1:
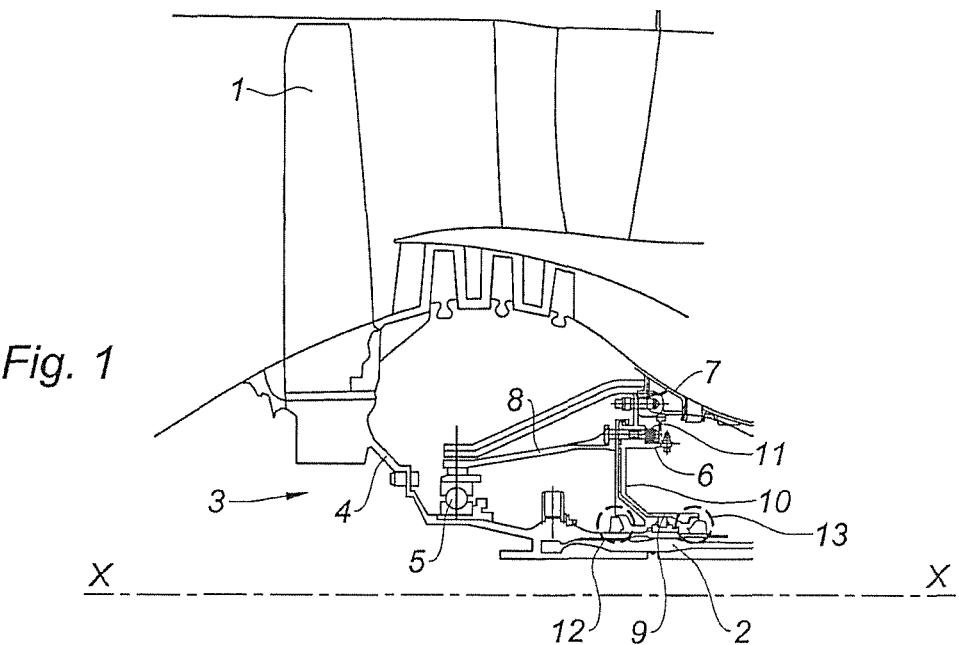
FIG. 1 is a schematic, sectional view along the axis of the turbine engine, of the front portion thereof comprising the fan rotor.

With reference to FIG. 1, a turbine engine according to the invention comprises a fan 1 which is fixed to a drive shaft 2 which sets said fan into rotation about the axis XX of the turbine engine, when the engine (not shown from behind) is operating.

The fan rotor 3 comprises, in this example, the fan itself with the blades thereof, the drive shaft 2, connection parts 4 between the shaft 2 and the fan 1, as well as the rotor portion of the low-pressure compressor, which is rigidly connected to the fan 1.

Said rotor is supported in this case by two successive bearings, from the front towards the rear following the flow of the gases. A first bearing 5 is connected to a flange 6 of the fixed structure 7 of the turbine engine by a frustoconical part 8, referred to here as a bearing support part. A second bearing 9 directly supports the drive shaft 2 and is connected to the fixed structure 7 by a second support part 10, which in this case is rigidly connected to the flange 6.

The support part 8 of the first bearing 5 is fixed to the flange 6 by a plurality of longitudinal fuse screws 11, passing through the different parts that they rigidly connect through circular holes, which are distributed circumferentially and matched up during assembly. According to known techniques, for example that described in FR-A1-2,877,46, said fuse screws 11 are designed to break if the longitudinal forces to which they are subjected exceed a certain threshold, corresponding for example to the imbalance in the event of the loss of a blade of the fan 3. When said screws 11 break, they decouple the support part 8 of the first bearing 5 from the flange 6 and thus allow the entire fan rotor 3 to move relative to the fixed structure 7 of the turbine engine. Generally, means (not shown in FIG. 1) block the support part 8 of the first bearing 5 in rotation and limit the translation thereof towards the front of the turbine engine.

Figure 2:
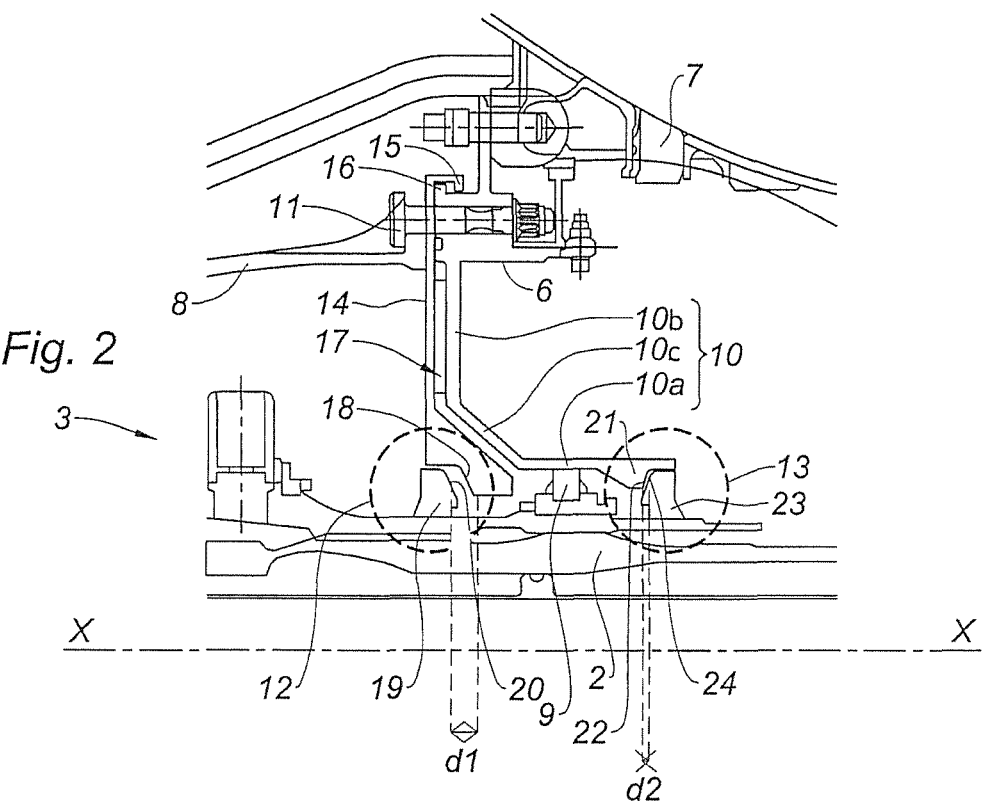
FIG. 2 is an axial sectional view of the front portion of the turbine engine comprising the invention, when the turbine engine is operating normally.
Figure 3:
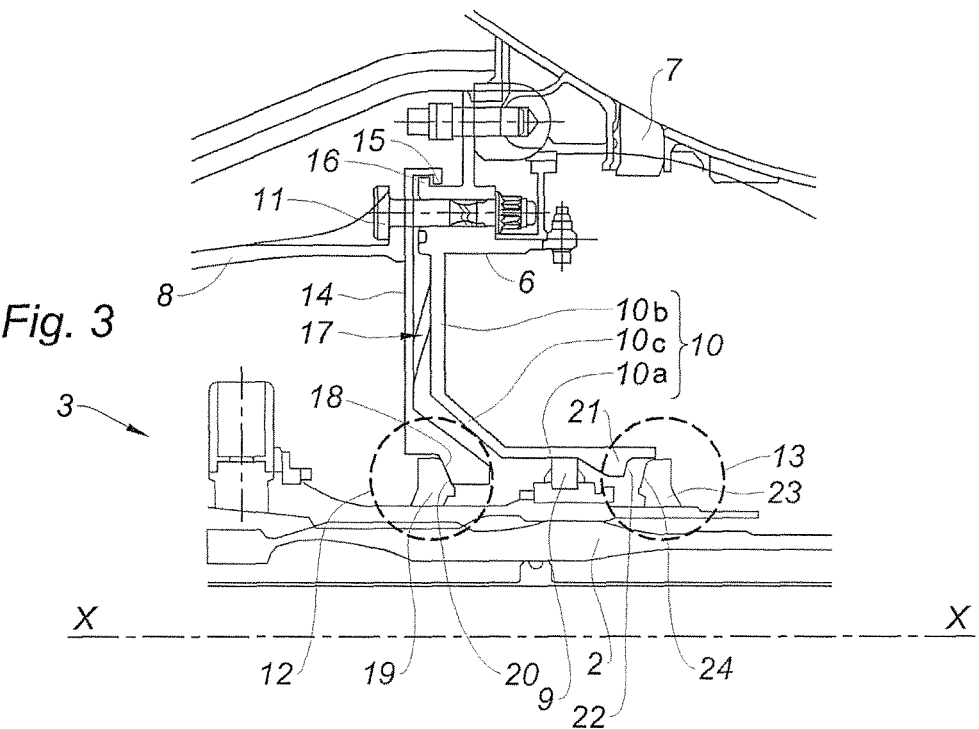
FIG. 3 is an axial sectional view of the front portion of the turbine engine comprising the invention, during a first accident sequence phase.
Figure 4:
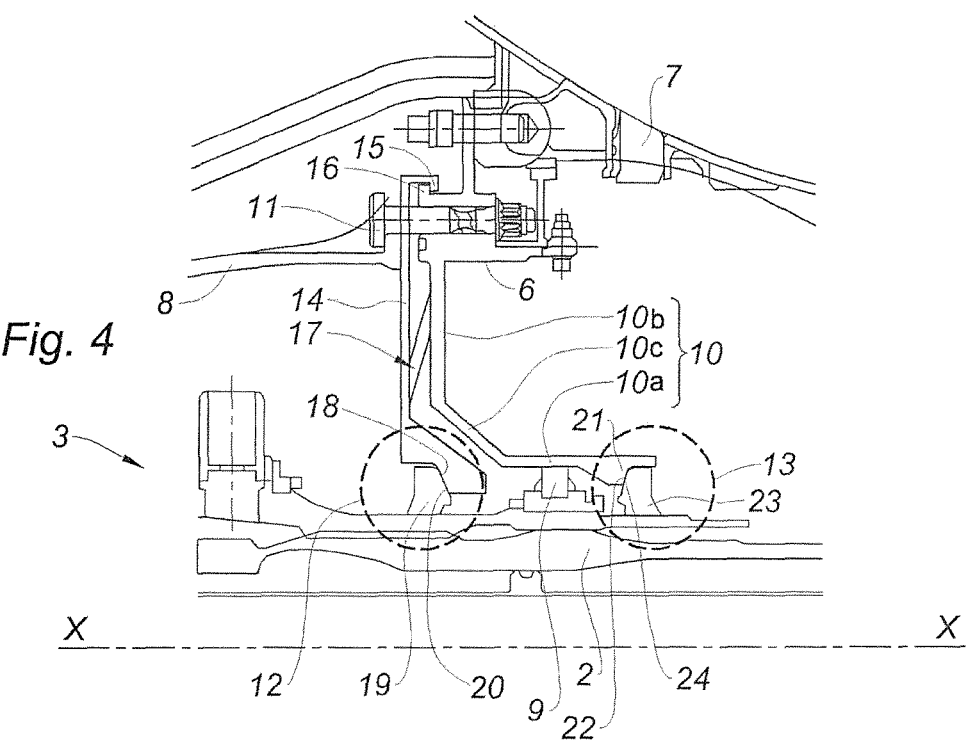
FIG. 4 is an axial sectional view of the front portion of the turbine engine comprising the invention, during a second accident sequence phase.

According to the invention, devices 12, 13 are arranged, in this case in the region of the shaft 2 around the second bearing 9, so as to brake the fan rotor 3 in the event of decoupling from the flange 8. FIGS. 2, 3 and 4 make it possible to explain in detail the features of a preferred, non-limiting embodiment of the invention.

With reference to FIG. 2, the support part 10 of the second bearing 5 comprises a cylindrical portion 10*a* to which is fixed the outer ring of the second bearing 9 and a portion 10*b*, forming a disc which is rigidly connected to the flange 6. These two portions, 10*a* and 10*b*, are interconnected by a portion 10*c*, which is substantially frustoconical. The front face of the disc 10*b* of the support part 10 of the second bearing 9 is set back slightly with respect to the front face of the flange 6.

In the normal operating position of the turbine engine, which is shown in FIG. 2, the fuse screw 11 holds the support part 8 of the first bearing 5 (not shown) against the flange 6, securing between the two a transverse part 14 which extends radially towards the shaft 2 of the fan rotor 3. The peripheral portion of the transverse part 14 comprises a bent edge 15 which comes to lie behind a radial peripheral edge 16 of the flange 6, leaving a space.

The central portion of the transverse part 14, which is in the shape of a disc, presses a washer 17 against the front face of the disc 10*b* of the support part 10 of the second bearing 9, which washer is accommodated in the setback with respect to the front face of the flange 6.

The washer 17 used in this case can be a grower washer, or a Belleville washer, named after the inventor thereof. This type of washer has the property of passing in a resilient manner, after it is compressed or not along the axis thereof, from the shape of a flat washer to a helical washer, for a grower washer, or a frustoconical washer, for a Belleville washer. In fact, said washer 17 can be replaced with any type of spring which is capable of moving the transverse part 14 away from the support part 10 in the direction of the axis of the turbine engine and of being accommodated in the setback provided by the disc-shaped portion 10*b* when the fuse screws 11 are clamped.

The radially inner portion of the part 14, which is in the shape of a frustoconical shoe, comes to rest radially under the frustoconical portion 10*c* of the support part 10 of the second bearing 9. On the inner radial corner thereof, at the front, a recess forms, hollowed into the part 14, a surface 18 of revolution around the axis of the turbine engine. Said surface 18 which is turned towards the front of the turbine engine comprises a substantially transverse portion and a cylindrical portion.

An annular ring 19 is fixed to the shaft 2, facing the recess in the transverse part 14. The rear face 20 of said ring 19 returns to the hollow form of the surface of revolution 18 of the recess of the transverse part 14, in such a way that the transverse portions of the rear face 20 of the stop and of the surface 18 of the recess abut one another if they are moved in translation one against the other.

In the configuration shown in FIG. 2, the rear face 20 of the ring 19 and the surface 18 of the recess of the transverse part 14, are moved away from one another by a determined distance d1 and are not in contact. They form a member which is connected to the fixed structure 7 of the turbine engine and a complementary element which is connected to the fan rotor 3, forming a first braking device 12 of the fan rotor 3, which can be seen in this case in the inactive mode.

Moreover, the cylindrical portion 10*a* of the support part 10 comprises, on the other side relative to the bearing 9, a ring 21 on the radially inner face of the rear end thereof. Said ring 21 has in the rear face thereof a recess which forms a surface of revolution 22 which is similar to the surface 18 of the front recess, but turned towards the rear of the turbine engine.

Likewise, an annular ring 23 is fixed to the shaft 2, facing the recess of the ring 21 on the support part 10. The front face 24 of said annular ring 23 has a shape which adapts to that of the surface of revolution 22 of the ring 21 on the support part 10 when they are pressed in translation along the axis of the turbine engine.

In the configuration shown in FIG. 2, the front face 24 of the ring 23 which is fixed to the shaft 2 and the surface 22 of the rear recess of the ring 21 on the support part 10, are moved away from one another by a determined distance d2 and are not in contact. They form a member which is connected to the fixed structure 7 of the turbine engine and a complementary element which is connected to the fan rotor 3, forming a second braking device 13 of the fan rotor 3, which can be seen in this case also in the inactive mode. It may be noted at this stage that the axial deflection d2 of the second braking device 13 is clearly weaker than the axial deflection d1 of the first device 12.

Advantageously, the contact surfaces 18, 20, 22, 24 of the two braking devices are formed of a layer of carbon or steel material, of the type used in a known manner in disc-brake devices.

With reference to FIG. 3, the configuration in a first situation in the decoupled mode when the fuse screws 11 have yielded will now be described.

In this situation, the support part 8 of the first bearing and the transverse part 14 are free in translation along the axis of the turbine engine relative to the flange 6 for fixing to the fixed structure 7 of the turbine engine. For various reasons, including vibrations, the behaviour of the fan rotor 3, and the thrust carried out by the grower washer 17, these two parts have a tendency to move apart, towards the front, of the fixing flange 6.

However, the bent edge 15, resting against the peripheral edge 16 of the flange 6, prevents the parts from escaping and holds said parts close to said flange 6. Moreover, the portion of each screw 11 which remains connected to the support part 8 and to the transverse part 14 remains fitted in the passage opening thereof through the flange 6 due to the movement apart being limited. In this way, the support part 8 of the first bearing and the transverse part 14 remain blocked in rotation relative to the fixed structure 7 of the turbine engine. In variants, other known devices (not shown here) can be adapted to obtain this effect.

The situation described in FIG. 3 corresponds to the case in which, in a first period, the fan rotor moved towards the rear.

Near the drive shaft 2 of the fan rotor 3, the first braking device 12 is now in the active mode because the surface 18 of the recess of the transverse part 14 and the surface of the rear face 20 of the ring 19 on the shaft 2 are in contact. In particular, the axially transverse portions thereof rub against one another.

The movement of the fan rotor 3 towards the rear leads to the movement of the shaft 2 relative to the fixed structure 7 of the turbine engine. In itself, this effect can remedy the axial deflection d1 which is provided between the two surfaces 18, 20 for the normal operation of the turbine engine. Incidentally, moreover, this device 12 also acts as a stop towards the rear to prevent the shaft 2 from moving towards the rear, which shaft could damage the low-pressure portion of the turbine engine with which it is in contact.

In addition, as has been noted previously, the grower washer 17 is opened out after the fuse screws 11 have broken. Said washer 17 moves the transverse part 14 towards the front. It thus makes it possible to remedy the axial deflection d1 more quickly and increase the pressure between the friction surfaces 18, 20.

However, during this first phase, the second braking device 13 remains inactive, since the contact surfaces 22 and 24 have, on the contrary, a tendency to move apart.

With reference to FIG. 4, in a second period, when the fan rotor 3 has a tendency to move back towards the front, the two braking devices 12 and 13 are active.

The second device 13 has a low axial deflection d2, as has been noted previously. Said device will thus intervene very quickly as a stop preventing the shaft 2, and thus the fan rotor 3, from following the movement thereof towards the front. Thus the two friction surfaces 22 and 24 come into contact, in particular in the region of the transverse portions thereof, and brake the rotor 3.

With regard to the first braking device 12, at the front of the bearing 9, as the grower washer 17 continues to push the transverse part 14, said part follows the movement of the shaft 2 towards the front, and the friction surfaces 18 and 20 remain in contact to brake the fan rotor 3.

In addition, since the shaft 2 is very quickly restrained in the movement thereof towards the front by the deflection d2 of the second braking device 13, which deflection is weak relative to the deflections d1 provided for the first device 12, the thrust of the grower washer 17 on the transverse part 14 induces pressure along the axis XX of the shaft 2, which pressure is exerted on the contact surfaces of the two braking devices 12 and 13. The two contact surfaces 18 and 22, of the two braking devices 12 and 13 respectively, which surfaces are connected to the fixed structure 7, are moved apart from one another by the thrust of the grower washer 17.

The resilient thrust of the grower washer 17 on the transverse part 14 holds the shaft 2 in an average position around the second bearing 9, by antagonistic thrusts transmitted to the two rings 19 and 23 which surround it on the shaft.

Having seen how the invention operates, these effects can be observed in an accident sequence, after the loss of a blade of the fan 1.

Figure 5:
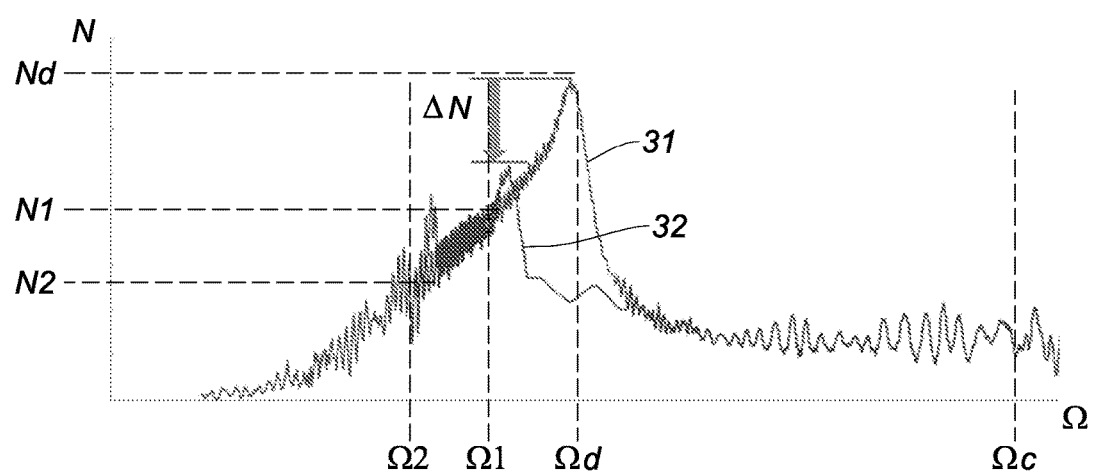
FIG. 5 shows the principal form of dynamic forces observed as a function of the speed of the fan rotor for a turbine engine, according to the invention and without the invention.

With reference to FIG. 5, the curve 31 indicates the principle form of the response in levels of transverse dynamic forces exerted on the second bearing 9 by a fan rotor 3 in the decoupled mode when said rotor is not braked. Said curve shows a maximum Nd for a speed $\Omega d$ of the fan rotor, which corresponds to the natural frequencies in the decoupled mode.

During an accident sequence, the speed of the fan rotor 3 decreases from the speed $\Omega c$, which corresponds to the cruising speed in normal operation, to a speed $\Omega 1$, which corresponds to the autorotation of the fan rotor 3 for flight conditions which make it possible to get back to a runway to land.

As has been mentioned previously, the turbine engine is designed so that the speed $\Omega 1$ is less than the resonance speed $\Omega d$ of the decoupled mode. The forces N1 are thus less than the maximum Nd. However, during the transition, the speed of the fan rotor reaches this resonance value $\Omega d$ and the bearing 9 is temporarily subjected to the maximum forces Nd.

The curve 32 indicates the principle form of the same response in levels of transverse dynamic forces exerted on the second bearing 9 by a fan rotor 3 in the decoupled mode when said rotor is braked by a device according to the invention. Said curve is substantially the same as the previous curve for the speeds remote from the speed $\Omega d$ which corresponds to the natural response in the decoupled mode.

The first effect of the braking is the reduction of the value $\Omega 2$ of the speed to which the autorotation of the fan rotor 3 stabilises in the stabilised flight conditions after the accident. Since the dynamic forces grow strongly at idling speeds with the speed, it can be seen that the braking makes it possible to greatly reduce the level N2 of said forces in the stabilised flight conditions after the accident relative to the value N1 which is obtained without braking. Moreover, the comparison between the two response curves 31 and 32 shows that the braking greatly reduces the maximum level of forces around the resonance speed $\Omega d$. The braking thus provides a second advantage, which is that of reducing by a significant value $\Delta N$ the maximum level of the dynamic forces observed during the phase of decrease in the speed of the fan rotor 3 after the loss of a blade.

The invention claimed is:

1. A turbine engine comprising a fixed structure, a fan rotor, having an axis of rotation, and an emergency brake of the fan rotor, said emergency brake comprising a first element, and a second element, a first member and a second member supported by the fixed structure, said first and second members respectively being configured so as to interact frictionally with the first element which is complementary to the fan rotor, by forming a stop of the fan rotor facing towards a rear of the turbine engine along the axis of rotation, and the second element which is complementary to the fan rotor, by forming a stop of the fan rotor facing towards a front of the turbine engine along the axis of rotation when the emergency brake is active, wherein the turbine engine further comprises a releasing means which is configured to release said first member so said first member moves in translation relative to the fixed structure along the axis of rotation, in a direction opposite to that for which it forms a stop, when the emergency brake is activated.

2. The turbine engine according to claim 1, wherein the first member is arranged in front of the second member along the axis of rotation.

3. The turbine engine according to claim 2, comprising at least a first bearing, which is mounted between the fan rotor and a support part, said releasing means comprising a fixing means for fixing said support part to the fixed structure which are arranged so as to break in the event of the loss of a blade of the fan, so as to form a device for decoupling the fan rotor.

4. The turbine engine according to claim 3, wherein said releasing means comprises a part which is rigidly connected to said first member and is connected to the fixed structure by the fixing means, and wherein a limiter limits the axial movement of said part when said fixing means is broken.

5. The turbine engine according to claim 4, which is arranged in such a way that said fixing means blocks said part from rotating about the axis of rotation when said fixing means is broken.

6. The turbine engine according to claim 1, further comprising a biasing means which is configured to bias said first member against the first element when said fixing means is broken.

7. The turbine engine according to claim 6, wherein the biasing means comprises a spring between said support part of said first member and the fixed structure.

8. The turbine engine according to claim 6, wherein only the first member is biased by said biasing means, the second member being mounted so as to be rigidly connected to the fixed structure.

9. The turbine engine according to claim 1, having a normal operating configuration, in particular before the loss of a fan blade, wherein the emergency brake is inactive and is configured in such a way that the gap along the axis of rotation between the first member and first element is larger than the gap between the second member and second element.

10. The turbine engine according to claim 1, wherein the fan rotor is centered and guided by at least a second bearing which is mounted between the fixed structure and the fan rotor, said second bearing being located between said first and second members.

11. The turbine engine according to claim 1, wherein the fan rotor comprises a drive shaft which supports at least one of said first and second elements.

12. The turbine engine according to claim 1, wherein in a first phase when the emergency brake is active, the first and a second members move apart from one another.

* * * * *